United States Patent
Waechter et al.

(10) Patent No.: US 6,687,970 B2
(45) Date of Patent: Feb. 10, 2004

(54) METHOD AND DEVICE FOR REMOVING PALLET RUNNERS

(75) Inventors: Ronald L. Waechter, P.O. Box 355, Daleville, IN (US) 47334; Thomas A. Waechter, Oldenberg, IN (US)

(73) Assignee: Ronald L. Waechter, Daleville, IN (US)

( * ) Notice: Subject to any disclaimer, the term of this patent is extended or adjusted under 35 U.S.C. 154(b) by 93 days.

(21) Appl. No.: 10/135,430

(22) Filed: Apr. 30, 2002

(65) Prior Publication Data

US 2003/0200639 A1 Oct. 30, 2003

(51) Int. Cl.[7] .................................. B23P 19/02
(52) U.S. Cl. ................... 29/426.4; 83/425; 83/923; 83/943; 83/704; 83/705; 29/402.01
(58) Field of Search ................ 29/402.01, 402.03, 29/402.11, 407.09, 407.1, 411, 417, 418, 426.1, 426.4; 83/923, 943, 35, 51, 704, 705, 435, 425, 425.1–425.4

(56) References Cited

U.S. PATENT DOCUMENTS

| | | | |
|---|---|---|---|
| 4,241,495 A | * 12/1980 | Wakeem | 29/700 |
| 4,320,570 A | * 3/1982 | Williams | 29/564.3 |
| 4,586,235 A | * 5/1986 | Benvenuto | 29/564.3 |
| 4,750,255 A | * 6/1988 | Hufnagel | 29/564.3 |
| 5,201,110 A | * 4/1993 | Bane | 29/564.3 |
| 5,323,525 A | 6/1994 | Johnson | |
| 5,600,882 A | * 2/1997 | Beane | 29/822 |
| 6,058,586 A | * 5/2000 | Bowling et al. | 29/402.11 |
| 6,128,992 A | 10/2000 | Waechter et al. | |
| 6,293,000 B1 | * 9/2001 | Smets | 29/564.3 |

* cited by examiner

*Primary Examiner*—Gregory Vidovich
*Assistant Examiner*—Stephen Kenny
(74) *Attorney, Agent, or Firm*—Woodard, Emhardt, Moriarty, McNett & Henry LLP

(57) ABSTRACT

A device and method for severing fasteners securing deck boards to pallet runners. A band saw extends across a table recess. The band saw is spaced above the tabletop aligning the saw between the deck boards and runners. The recess includes stop surfaces enabling the pallet to be pivoted from a horizontal position through a vertical position and then to an upside down position while the saw blade remains within the pallet for severing fasteners securing the opposite top deck board from the pallet.

11 Claims, 9 Drawing Sheets

METHOD AND DEVICE FOR REMOVING PALLET RUNNERS

BACKGROUND OF THE INVENTION

1. Field of the Invention

The present invention relates generally to the field of band saws and more specifically, those saws used to sever runners or stringers from deck boards of a pallet or skid.

2. Description of the Prior Art

Wooden pallets or skids become damaged through continued use and particularly as a result of contact with the forks of forklift trucks. Wooden pallets have a plurality of parallel top deck boards and bottom deck boards spaced apart but secured together by wooden runners that extend crosswise relative to the deck boards. The deck boards and runners are secured together by conventional fastening devices, such as by nails. Typical pallet damage occurs when the runner located at the end of the pallet is split or otherwise damaged by the lifting device. A solution is to insert a new runner between the deck boards while fastening the new runner inwardly of and to the damaged runner. The pallet is therefore structurally sound; however, the amount of space between the added end runner and the runner which extends at the midway point across the pallet or to the runner located at the opposite end of the pallet is reduced. Certain robotic machines have lifting arms spaced apart to fit exactly into the pallet between the original undamaged runners. As a result of the aforementioned repair technique of inserting an additional runner, the amount of space between runners is reduced and thus such a pallet does not allow certain robotic lifting arms to be inserted therein. Pallets are therefore classified according to whether or not a pallet has been damaged or repaired as described. For example, the value of a pallet that is not damaged typically may be $5.00 to $5.50 each whereas a pallet that has been damaged but repaired by the addition of an additional interior runner has a worth of only approximately $1.50 to $2.50 each. The aforementioned repair technique therefore has serious financial consequences.

It is therefore desirable to completely remove the damaged runner from the pallet in a cost effective manner. One technique is to utilize the band saw disclosed in our U.S. Pat. No. 6,128,992 wherein a pair of band saws simultaneously sever the fasteners securing the opposite deck boards to the runners. In lieu of utilizing a pair of band saws along with the associated drive mechanisms, it is desirable to provide a device having a single band saw wherein the saw may be used to sever the fasteners securing the bottom and top deck boards to the runner. Disclosed herein is such a saw supported for movement above a table allowing the pallet to be pivoted by a single operator enabling the same saw to be used for severing the bottom deck board fasteners as well as the top deck board fasteners.

U.S. Pat. No. 5,323,525 issued to John L. Johnson discloses a cutter head for a pallet dismantling machine. In many cases, round disc type pallet dismantlers cause damage to the deck boards and leave nail stubble. Additional techniques, include a common band saw used to saw into the pallet between the end runners and deck boards with the pallet then being pulled backwards, the pallet flipped over and the opposite deck boards then being sawed from the runners. A problem develops when the pallet is pulled backwards to extricate the saw blade from within the pallet since the saw blade teeth are on the trailing edge of the saw as the saw is moved from the pallet.

SUMMARY OF THE INVENTION

One embodiment of the present invention is a saw for removing a runner of a pallet with the pallet having top deck boards and bottom deck boards secured to the runner by fasteners The pallet has a normal horizontal position, an upside down horizontal position and when on end a vertical position. A table has a table surface for supporting the pallet in the normal horizontal position and further has a stop surface beneath the table surface for supporting the pallet when on end in a vertical position. A band saw is movably mounted to the table and has teeth movable across the table surface. The band saw is located a first distance apart from the table surface for severing fasteners holding bottom deck boards to a runner of the pallet as the pallet is moved in a forward direction past the saw. The band saw is located a second distance greater than the first distance apart from the stop surface allowing the pallet to be pivoted to a vertical position and then to an upside down horizontal position while the saw remains within the pallet between the deck boards enabling the pallet to be pulled in the forward direction severing fasteners securing the runner to the top deck boards.

Another embodiment of the present invention is a method of removing a damaged runner secured by fasteners to top deck boards and bottom deck boards of a pallet. The method includes the step of providing a device with a pallet supporting surface, a stop surface spaced from the supporting surface and a saw movable across the pallet supporting surface. The pallet is positioned upon the supporting surface and aligned with the saw so the saw passes between the bottom deck boards and the runner severing the fasteners. The pallet is pivoted upon the stop surface to an upside down position while the saw remains within the pallet between the top deck boards and the bottom deck boards. The saw then passes between the top deck boards and the runner.

It is an object of the present invention to provide a new and improved method and device wherein the fasteners securing top deck boards to a pallet runner and the fasteners securing the bottom deck boards to the pallet runner are severed enabling a damaged runner to be removed.

It is an object of the present invention to provide a table band saw for severing fasteners holding bottom deck boards to a runner when the pallet is moved in a first direction and then for severing fasteners holding the top deck boards to the pallet runner after the pallet is pivoted upside down and moved past the saw in the first direction.

A further object of the present invention is to provide a new and improved method for removing a damaged runner secured by fasteners to top deck boards and bottom deck boards of a pallet.

Related objects and advantages of the present invention will be apparent from the following description.

DESCRIPTION OF THE PREFERRED EMBODIMENTS

Figure 1:
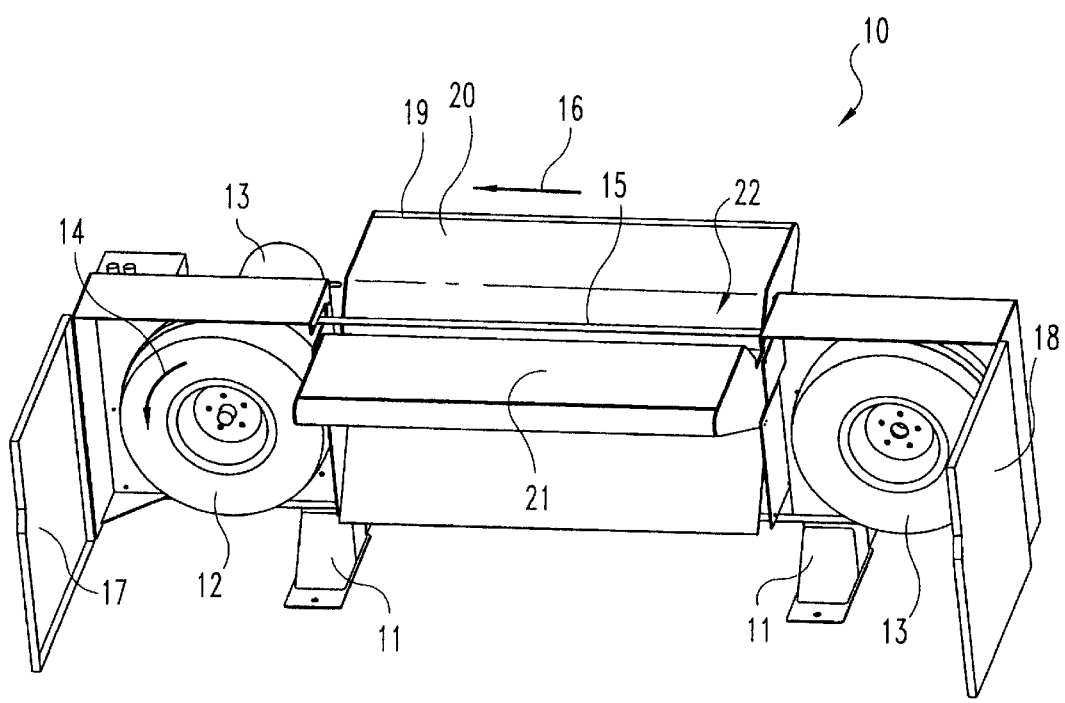
FIG. 1 is a top perspective view of the saw device incorporating the present invention with the cabinet doors in the opened position.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a table saw 10 with a main frame 11 having rotatably mounted thereto a pair of drums 12 and 13. Drum 12 is the driving drum for the band saw and has a conventional motor 13 mounted to frame 11 for rotating drum 12 in the direction of arrow 14 thereby pulling the continuous band saw 15 in the direction of arrow 16. Drum 13 is a follower drum with the continuous band saw 15 extending approximately 180 degrees around drum 13 and 180 degrees around drum 12. A pair of cabinet doors 17 and 18 are pivotally mounted to frame 11 and are in the normal closed position. The doors may be opened to enable servicing of the drums and band saw.

A horizontal table 19 is mounted to frame 11 and has a horizontally extending surface 20 and a horizontally extending surface 21 positioned on the opposite sides of band saw 15 which extends thereacross.

Figure 2:
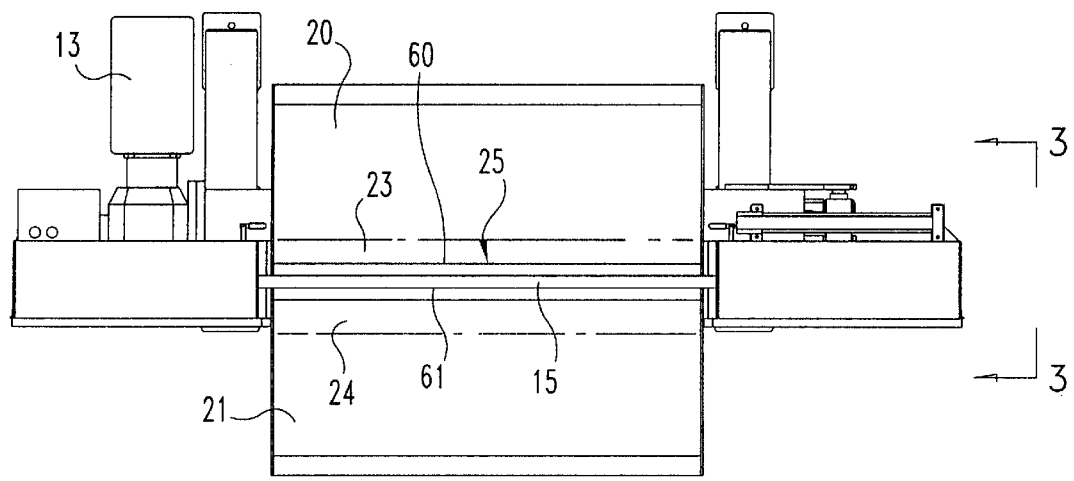
FIG. 2 is a top view of the device of FIG. 1 with the cabinet doors in the closed position.

A recess 22 is provided on surfaces 20 and 21 and is formed by a pair of downwardly extending or slanted surfaces 23 and 24 (FIGS. 2 and 3) both terminating in a slot 25 opening downwardly and positioned over a downwardly extending guide wall 26 (FIG. 3) mounted to frame 11. Band saw 15 extends outwardly and above surfaces 20 and 21 as the saw extends across the tabletop. The saw then extends around drum 12 and along the bottom of the table to drum 13 whereat the saw extends upwardly and then back across the table.

Figure 4:
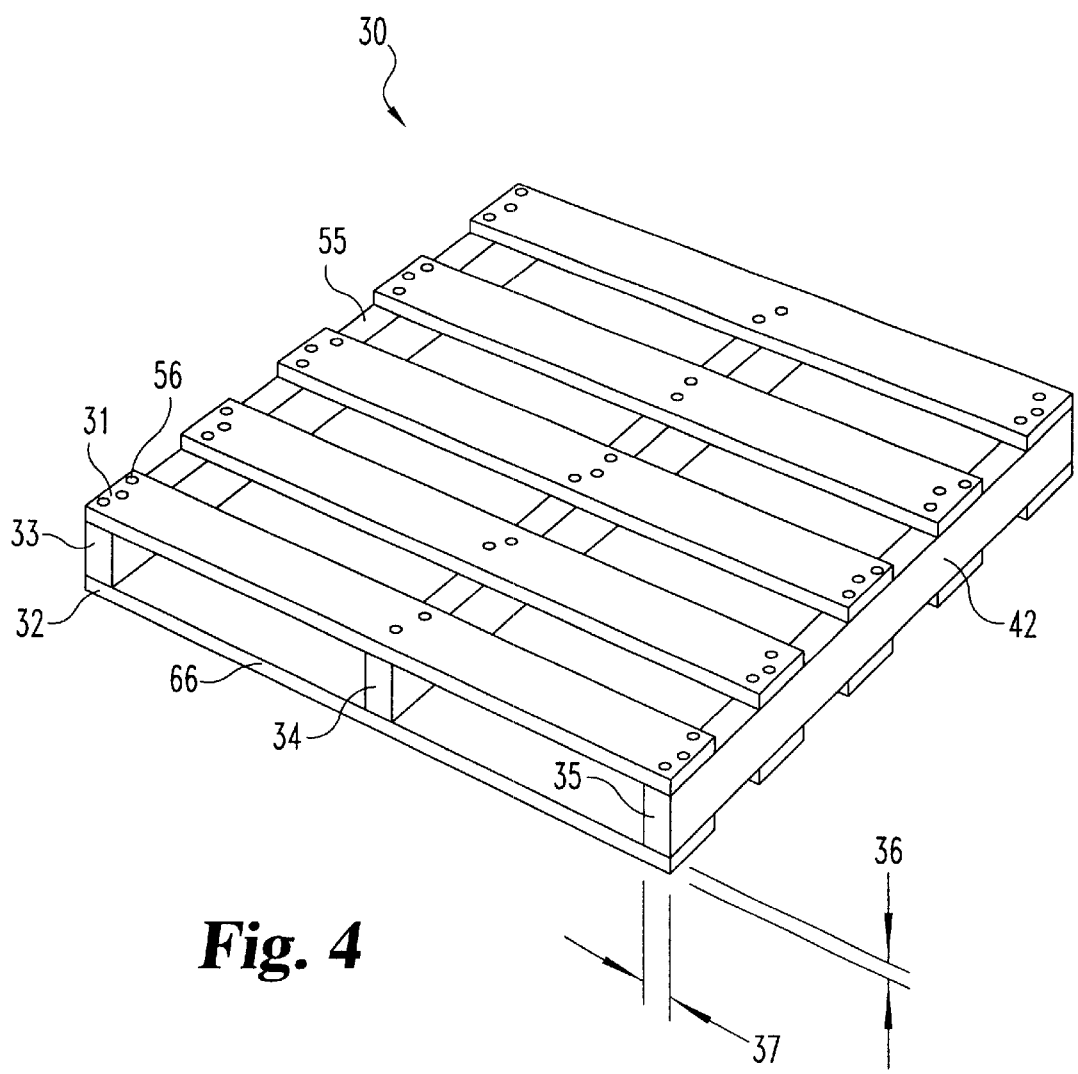
FIG. 4 is perspective view of a conventional wooden pallet.

A conventional wooden pallet 30 is shown in FIG. 4 and has a plurality of top deck boards 31 and a plurality of bottom deck boards 32 spaced apart by three runners 33, 34 and 35. Runners 33–35 are secured to the top deck boards by conventional fasteners, such as nails. Likewise, the runners are secured to the bottom deck boards by a plurality of fasteners, such as nails. The band saw disclosed herein is useful in severing the fasteners securing the top and bottom deck boards to the runners to enable the runners to be removed and replaced and/or allowing one or more of the deck boards to be removed and replaced. The band saw disclosed herein is particularly advantageous for use in removing a damaged end runner.

The thickness 36 (FIG. 4) of the bottom deck boards 32 is equal to the thickness of top deck boards 31. Likewise, the width 37 of runner 35 is equal to the widths of runners 33 and 34 and is substantially greater than thickness 36. The top deck boards 31 and bottom deck boards 32 extend generally horizontally between ends 42 and 55 of the pallet with runners 33–35 extending generally perpendicularly to and located between while spacing apart the top deck boards from the bottom deck boards. Fasteners 56 extend through the top deck boards and into the runners securing the top deck boards thereto. Likewise, similar fasteners extend through the bottom deck boards into the runners.

Saw blade 15 must be spaced apart a fixed distance 40 (FIG. 3) above the top surfaces 20 and 21 of the table a distance equal to the thickness 36 of the deck boards in order to automatically align the saw blade between the deck boards and runners. Thus, as the pallet is moved across the upwardly facing surface of the table, the saw blade will pass between the deck boards and the runner thereby severing the fasteners.

Figure 5:
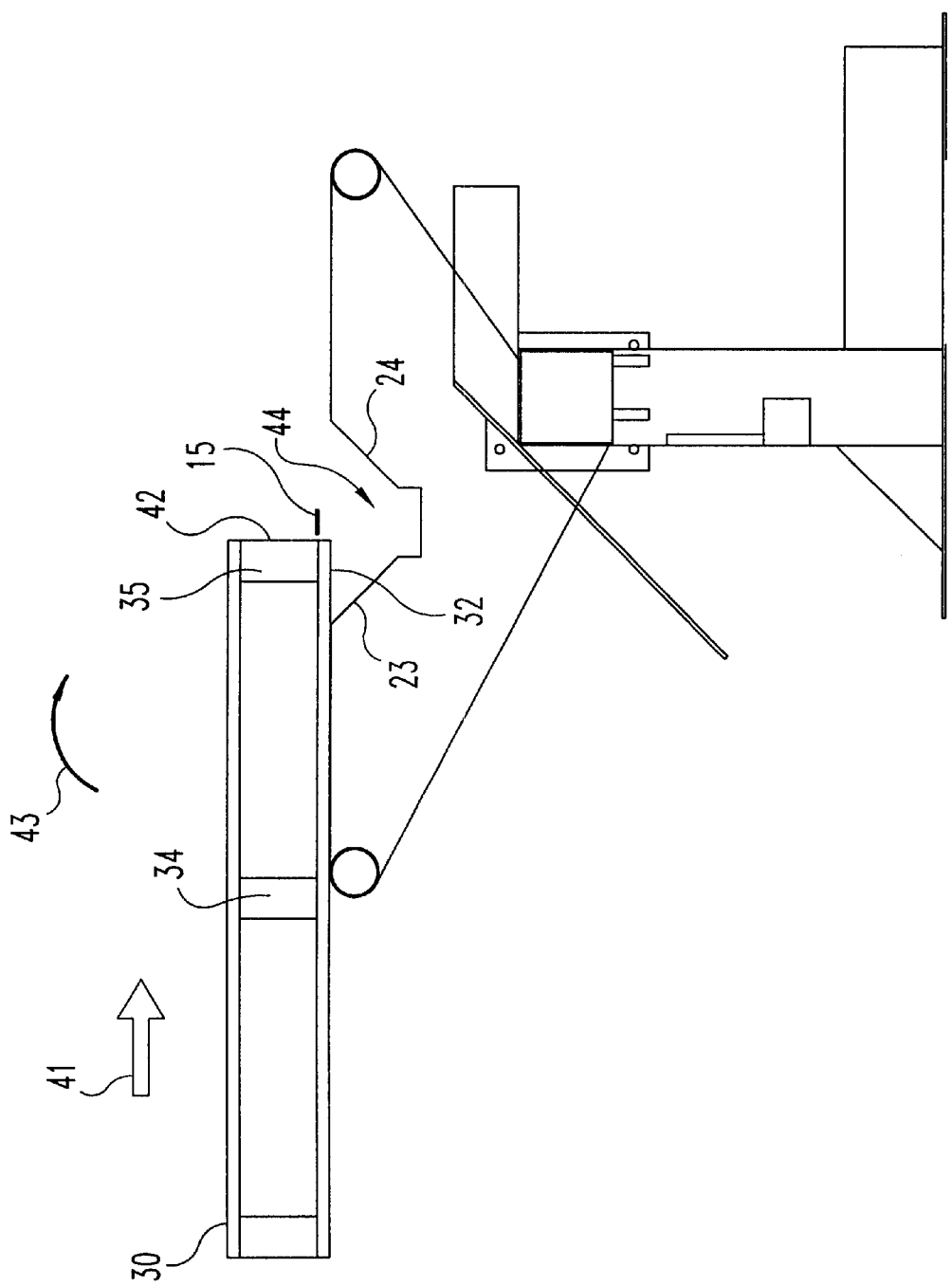
FIG. 5 is the same view as FIG. 3 only showing the pallet being moved across the table to sever the fasteners securing one end runner from the bottom deck boards.
Figure 6:
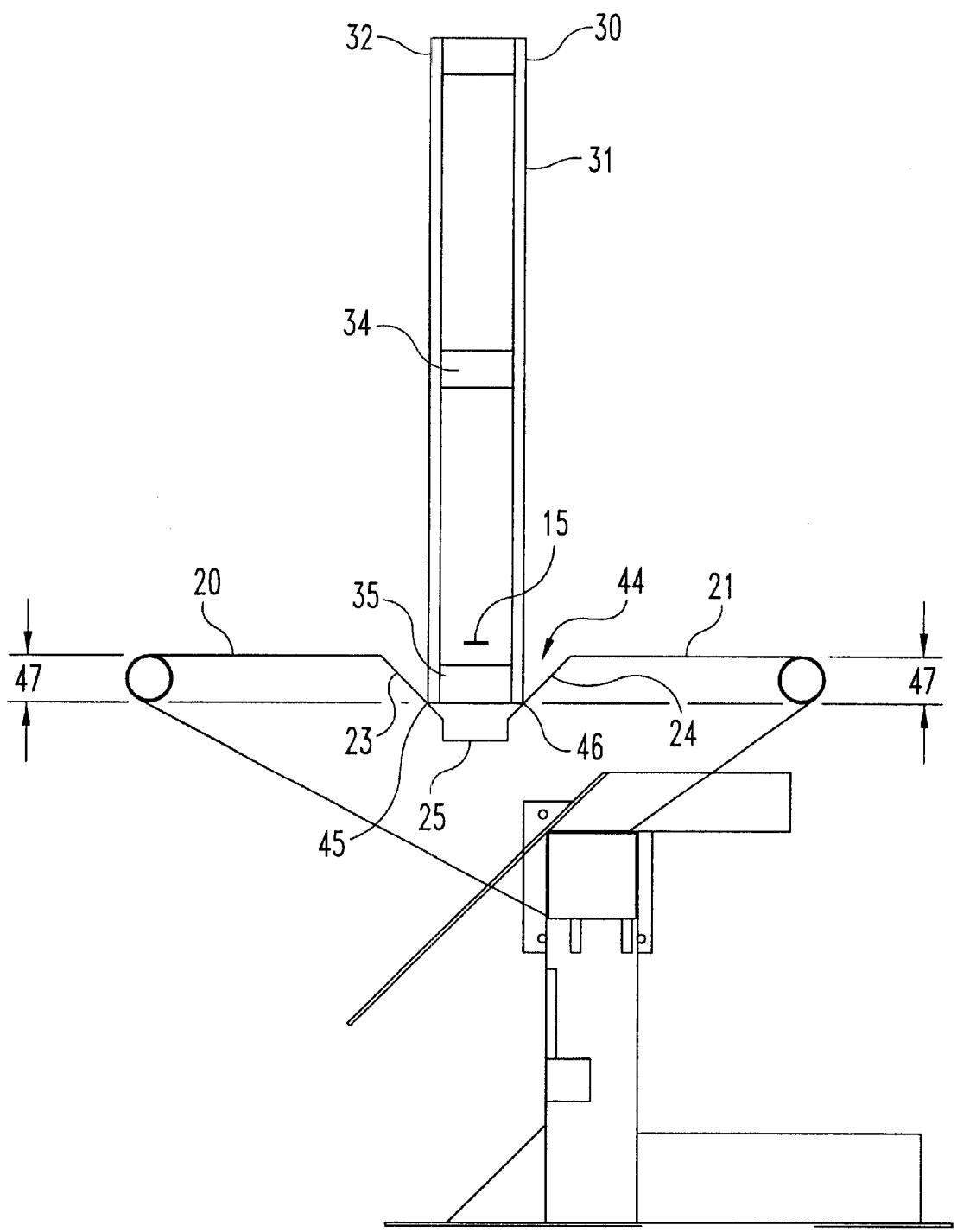
FIG. 6 is the same view as FIG. 5 only illustrating the pallet in a vertical position as it is pivoted from a first horizontal position of FIG. 4 to an upside down horizontal position of FIG. 7.

The method of removing a damaged runner secured by the fasteners to the top deck boards and bottom deck boards of the pallet comprises the first step of providing the device shown in the drawing having the pallet supporting surface 20 and 21. The pallet is first positioned atop surface 20 so that the damaged runner 35 extends across the width of the table and is parallel with saw blade 15. In such a position, blade 15 is automatically aligned between runner 35 (FIG. 5) and the bottom deck boards 32. The pallet is then pushed in the direction of 41 severing the fasteners extending through deck boards 32 and into runner 35. Once the pallet has been moved sufficient distance in the direction of arrow 41 to position blade 15 between runners 34 and 35, the pallet is pivoted about pallet end 42 in a clockwise direction 43 as viewed in FIG. 5. In the event that a repair runner has been previously inserted between runners 34 and 35, and secured to runner 42, then the pallet must be moved a sufficient distance to position the saw between the inserted repair runner and runner 34. As the pallet is pivoted, the pallet end 42 will therefore move downwardly into the recess 44 formed by surfaces 23 and 24 extending downwardly from tabletop surfaces 20 and 21. Eventually, pallet 30 will assume a vertical position in recess 44 (FIG. 6). Surfaces 23 and 24 are spaced sufficiently apart to allow the pallet to extend downwardly into recess while acting as stop surfaces to prevent the pallet from extending through slot 25. The bottom end of bottom deck boards 32 contact surface 23 at location 45 whereas the bottom end of top deck boards 31 contact surface 24 at location 46. Both locations 45 and 46 are located equidistant beneath tabletop surfaces 20 and 21 as illustrated by equi-distances 47. The sum of the distance 40 of saw blade 15 above surfaces 20 and 21 and the distance 47 is greater than sum of the width 37 of runner 35 and the width of any repair runner previously inserted between runners 34 and 35 and attached to runner 35. Thus, saw blade 15 is positioned within the pallet between the top deck boards and bottom deck boards and is located above runner 35 and between runners 34 and 35 when the pallet is pivoted to the vertical position as shown in FIG. 6. That is, blade 15 does not interfere within any portion of the pallet when pivoted to the vertical position.

Figure 7:
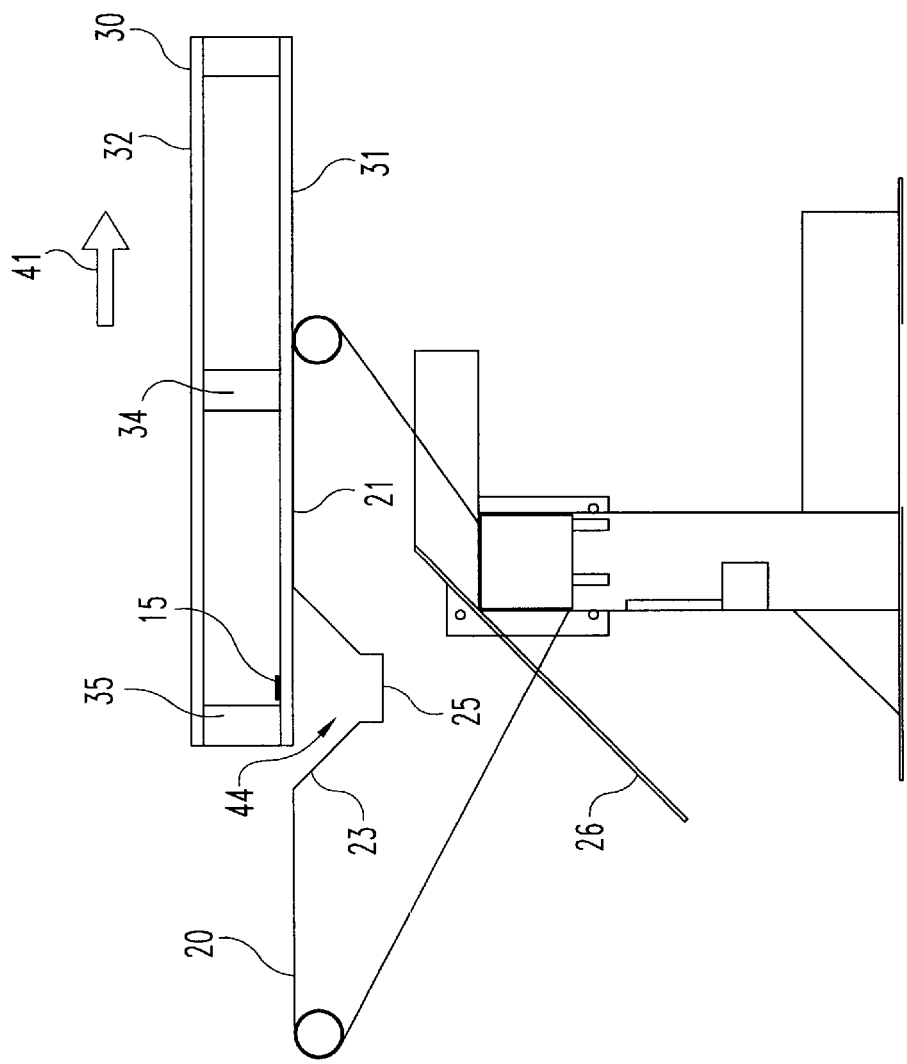
FIG. 7 is the same view as FIG. 5 only showing the pallet in an upside down position moving across the table to sever the fasteners holding the top deck boards to the end runner.

The next step in the method is to continue the pivotal motion about pallet end 42 in the direction of arrow 43 until the pallet is in an upside down horizontal position resting atop horizontal surface 21 of the table. The pallet is moved from the vertical position of FIG. 6 to the upside down horizontal position of FIG. 7 while saw blade 15 remains within the pallet between the top deck boards and bottom deck boards. Since the thickness of the top deck boards are equal to the thickness of the bottom deck boards and, in turn, equal to the spacing of saw blade 15 above tabletop surface 21, the blade is automatically aligned to pass from between runners 34 and 35 and between the top deck boards 31 and runner 35 thereby severing the fasteners securing the top deck boards to runner 35 as the pallet is pushed in direction 41. Runner 35 is thereby completely unattached from both the bottom deck boards and top deck boards and may be pushed outwardly from the pallet falling into recess 44 and through slot 25 falling onto guide wall 26 directing the separating runner to a disposal bin or conveyor.

The width 57 of slot 25 (FIG. 3) is less than the horizontal distance between contact areas 45 and 46 (FIG. 6) thereby preventing the pallet from falling through the slot. Width 57 is greater than the width 37 (FIG. 4) of the runners plus any repair runner attached thereto enabling the runners to fall therethrough.

Figure 8:
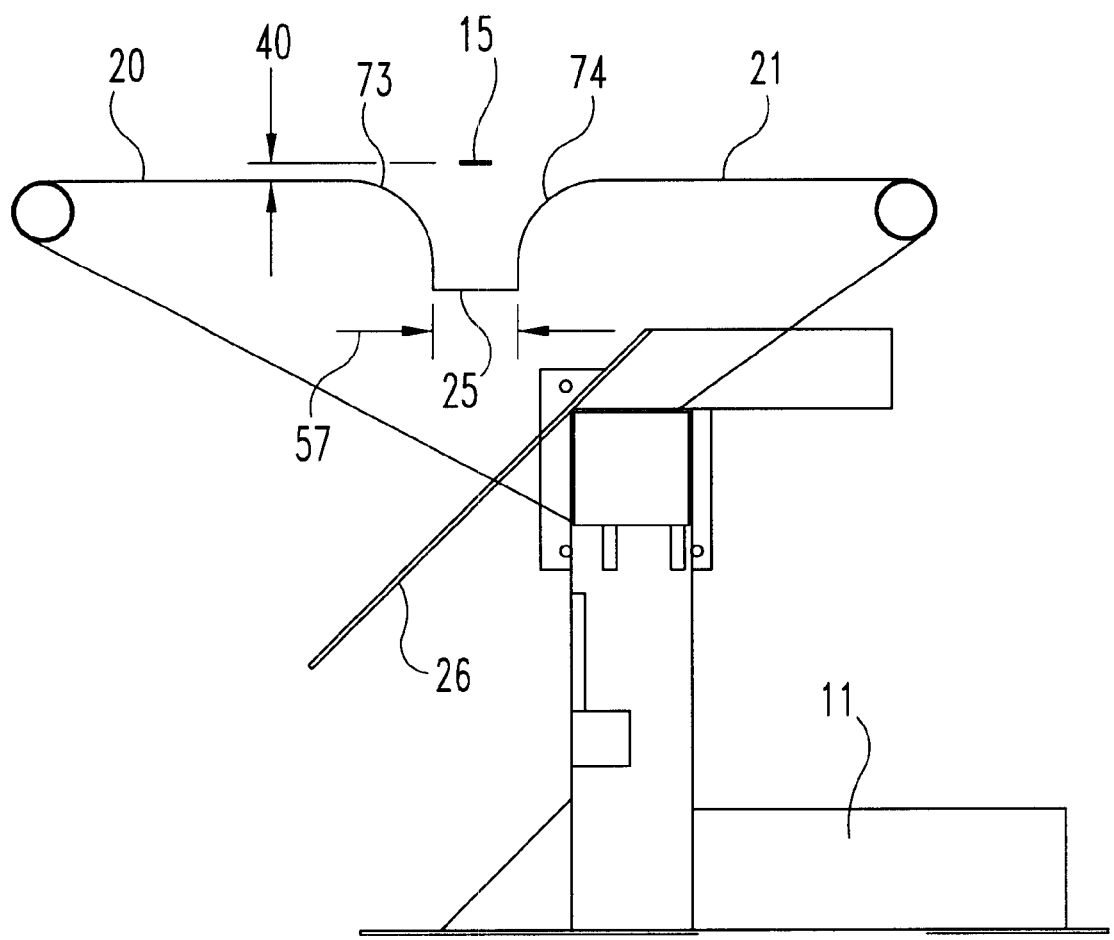
FIG. 8 is the same view as FIG. 3 only showing an alternate embodiment of the surfaces for supporting the pallet in a vertical position as it is turned upside down.

Slot 25 has a lengthwise extending first side edge 60 (FIG. 2) extending across the width of the table being parallel to saw blade 15 with surface 23 extending upwardly from side edge 60 to tabletop surface 20. Likewise, the opposite side of slot 25 has a lengthwise extending side edge 61 extending across the width of the table with surface 24 extending upwardly from side edge 61 to tabletop surface 21. Slanted surface 23 supports the bottom deck boards as the pallet is pivoted from the horizontal position of FIG. 5 to the vertical position of FIG. 6. Likewise, the opposite slanted surface 24 supports the top deck boards as the pallet is pivoted from the vertical position of FIG. 6 to the upside down horizontal position of FIG. 7. In lieu of utilizing flat, downwardly slanted surfaces 23 and 24, the present invention includes utilizing a pair of convex or rounded surfaces 73 and 74 (FIG. 8) to support the pallet in a vertical position as the pallet is pivoted from the normal horizontal position to the upside down horizontal position.

Many variations are contemplated and included in the present invention. For example, the saw and pallet have been described for the purpose of removing end runner 35; however, it is to be understood the band saw can also be used to remove all runners, namely, runners 33–35 from the pallet. In such a case, the pallet is pushed entirely past the band saw in direction 41. Further, in lieu of removing runners from the pallet, the device disclosed in the drawing is also useful in removing only deck boards. For example, in the event the end bottom deck board 66 (FIG. 4) is damaged, the pallet may be rotated 90 degrees from what is shown in FIG. 4 with the pallet then being rested upon tabletop surface 20 and the band saw 15 being aligned between board 66 and runners 33–35. The pallet may then be moved in the direction of arrow 41 so that band saw 15 simultaneously passes between board 66 and runner 33, board 66 and runner 34 and board 66 and runner 35 thereby severing the fasteners securing bottom deck board 66 from the pallet. The damaged board 66 may then be allowed to fall through slot 25 with the pallet then being removed from the table and a new deck board installed.

Figure 3:
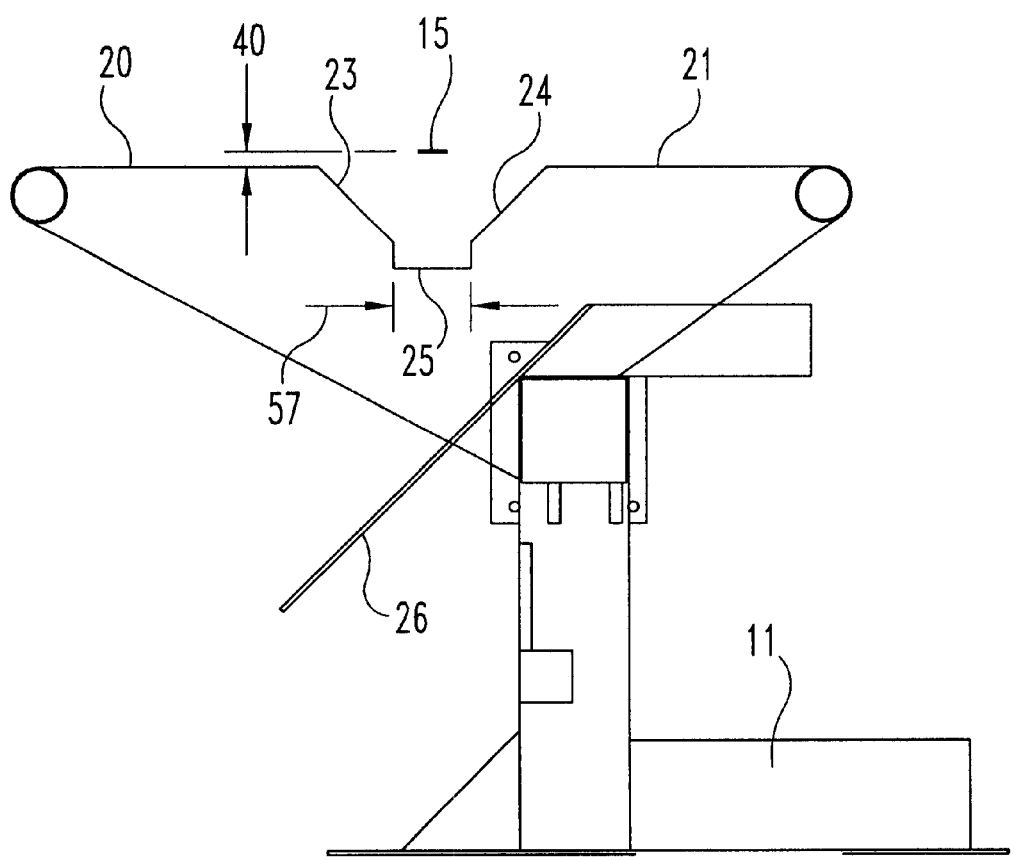
FIG. 3 is an end view looking in the direction of arrows 3—3 of FIG. 2.
Figure 9:
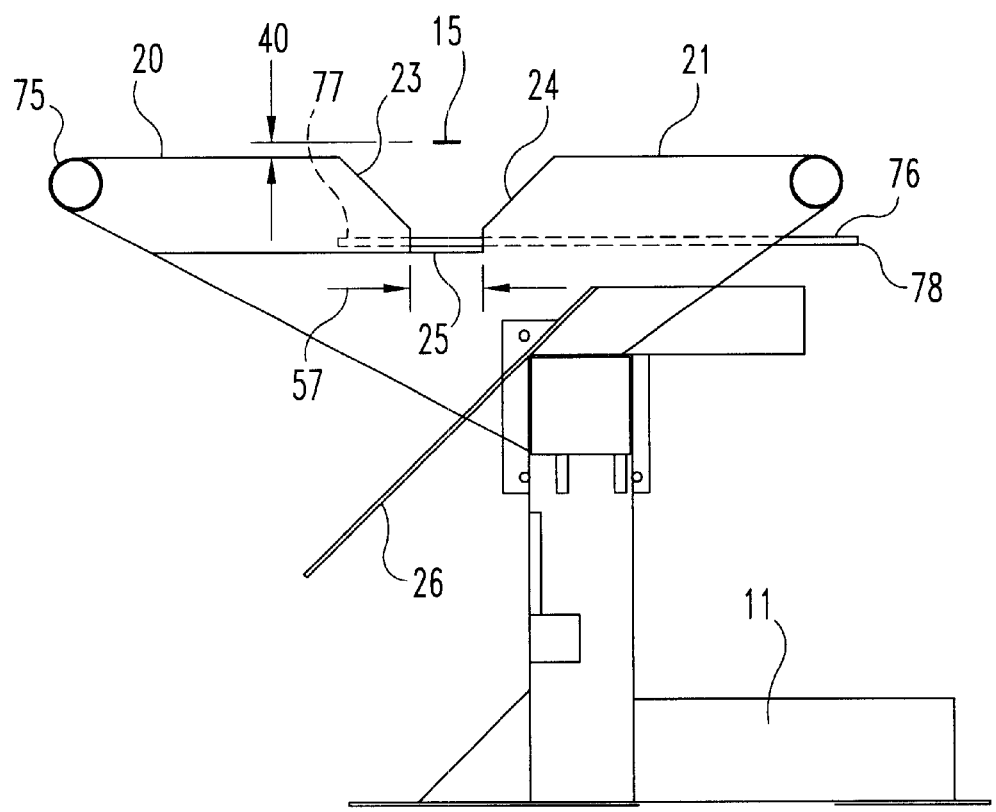
FIG. 9 is the same view as FIG. 3 only showing an alternate embodiment of the table top 20 which pivots for aligning the pallet with the saw blade.

An alternate embodiment of the present invention is shown in FIG. 9 and is identical to the embodiment shown in FIG. 3 except table top surface 20 and surface 23 are pivotable mounted to tube 75 and may be pivoted upwardly or downwardly as a unit to more precisely align the junction between the pallet end runner and the saw blade. A pivot arm 76 has a proximal end 77 pivotally mounted to tube 75 or some other portion of the frame 11 with the opposite distal end 78 of arm 76 extending outwardly of the aft end of table top surface 21. Arm 76 extends to the side of slot 25 to avoid interference with pallet portions falling through the slot. By pivoting arm 76 upwardly about end 77, the arm forces both table top surface 20 and its connected surface 23 upwardly thereby aligning the junction between the pallet end runner 35 and bottom deck boards 32 resting atop surface 23 with the saw blade 15 as the pallet is pushed past the saw blade as depicted in FIG. 5.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. The combination:

a pallet having a first end and a second end, said pallet having top deck boards and bottom deck boards extending generally horizontally between said first end and said second end and further having a runner at said first end extending generally perpendicularly to and located between and spacing apart said top deck boards and said bottom deck boards, said pallet including a plurality of fasteners securing said top deck boards and said bottom deck boards to said runner, said pallet having a first horizontal position when said-bottom deck boards are positioned beneath said top deck boards, a vertical position when said bottom deck boards and said top deck boards are positioned vertically, and a second horizontal position when said top deck boards are positioned beneath said bottom deck boards;

a table having a surface for supporting said pallet when extending in said first horizontal position, said table having a recess opening upwardly through said surface for said first end of said pallet to rest as said pallet moves from said first horizontal position, via said vertical position, to said second horizontal position; and, a saw to sever said fasteners securing said bottom deck boards to said runner when said pallet is in said first horizontal position and said first end is moved in a first direction past said saw which is spaced from said surface adjacent said recess and being aligned between said bottom deck boards and said runner, said pallet movable in said recess from said first horizontal position to said vertical position while said saw is located within said pallet and then from said vertical position to said second horizontal position and moved in said first direction for said saw to sever said fasteners securing said top deck boards to said runner.

2. The combination of claim 1 wherein:

said recess is sized to allow limited downward movement of said pallet relative to said saw when moved to said vertical position locating said pallet so said saw is between said top deck boards and said bottom deck boards above said runner.

3. The combination of claim 2 wherein:

said recess has a slot through which said runner may fall, said recess has a lengthwise extending first side and an opposite lengthwise extending second side, said recess further has a first slanted surface leading from said surface into said first side of said slot to support said bottom deck boards as said pallet is pivoted from said first horizontal position to said vertical position.

4. The combination of claim 3 wherein:

said recess has a second slanted surface leading from said surface into said second side of said slot to support said top deck boards as said pallet is pivoted from said vertical position to said second horizontal position.

5. The combination of claim 4 wherein:

said first slanted surface and said second slanted surface along with said slot are sized to limit movement of said first end of said pallet into said slot while positioning said runner beneath said saw when said pallet is pivoted from said first horizontal position to said vertical position locating said saw within said pallet between said top deck boards and said bottom deck boards and above said runner, said pallet movable from said vertical position to said second horizontal position atop said surface and movable in said first direction positioning said saw to sever said fasteners securing said top deck boards to said runner.

6. The combination of claim 5 wherein:

said first slanted surface and said second slanted surface are each convex.

7. A method of removing a damaged runner secured by fasteners to top deck boards and bottom deck boards of a pallet comprising the steps:

providing a device with a pallet supporting surface, a stop surface spaced from said supporting surface and a saw movable across said pallet supporting surface;

positioning said pallet upon said supporting surface;

aligning said pallet with said saw so said saw passes between said bottom deck boards and said runner when said pallet is moved thereby;

initially moving said pallet past said saw in a first direction severing said fasteners securing said bottom deck boards to said runner;

pivoting said pallet upon said stop surface to an upside down position while said saw remains within said pallet between said top deck boards and said bottom deck boards;

aligning said pallet when upside down so saw passes between said top deck boards and said runner when said pallet is moved thereby; and, additionally moving said pallet past said saw in an upside down position in said first direction severing said fasteners securing said top deck boards to said runner.

8. The method of claim 7 and comprising the further step of:

moving said pallet downwardly on said stop surface during said pivoting step so said saw is positioned above said runner but between said top deck boards and said bottom deck boards.

9. The method of claim 8 and comprising the further step of:

separating said runner from said pallet once said initially moving step and said additionally moving step are completed.

10. The method of claim 9 wherein:

said providing step includes proving a slot adjacent said stop surface; and further comprising the step of directing said runner through said slot once said separating step is completed.

11. The method of claim 7 wherein:

said pivoting step occurs after said initially moving step but before said additionally moving step.

\* \* \* \* \*